C. S. LOCKWOOD.
ROLLER BEARING CAGE.
APPLICATION FILED OCT. 19, 1912.

1,095,336.

Patented May 5, 1914.

Witnesses:
L. Lee.
J. Walter Greenbaum.

Inventor
Charles S. Lockwood
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING CAGE.

1,095,336.  Specification of Letters Patent.  Patented May 5, 1914.

Application filed October 19, 1912. Serial No. 726,615.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearing Cages, fully described and represented in the following specification and the accompanying drawings, forming a part of the same.

The present invention relates to roller bearings having a series of rolls fitted between a shaft and the cylindrical bore of a casing, and guided in their movements by a cage having heads at opposite ends of the rolls.

It has been common to fit the inner or outer periphery of the cage-heads to contact loosely with the shaft or the bore of the casing, to hold the cage concentric with the shaft in its movements. As such heads are made thin to avoid weight and any increase in the length of the casing, the periphery of the head cuts or wears into the shaft or bore of the casing when moving in contact therewith, thus loosening the cage and permitting it to move out of the desired path.

The object of the present invention is to greatly increase the bearing surface of the cage-heads upon the cylindrical surface within the casing so as to longer maintain the cage in a working relation to the shaft, and this object is effected by projecting integral lugs from the inner or outer periphery of the cage-heads between the bearing surfaces of the rolls, to contact lightly with the shaft or casing.

By projecting the lugs toward one another, which can be done without interference with the rolls, the bearing surface may be increased to any desired extent, and without necessitating any increase in the length of the casing, or any necessity of thickening the heads of the cage to increase their bearing surface. If projected from the outer periphery of the head, the lugs move in contact with the bore of the casing, and if projected from the inner periphery they move in contact with the shaft.

The invention will be understood by reference to the annexed drawing, in which—

Figure 2:
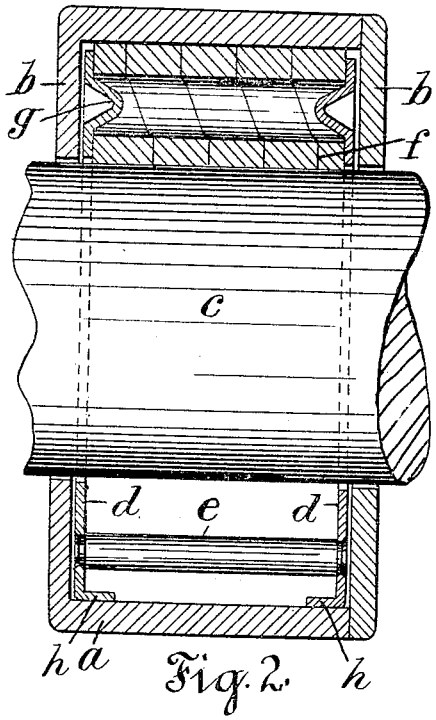
Figure 1:
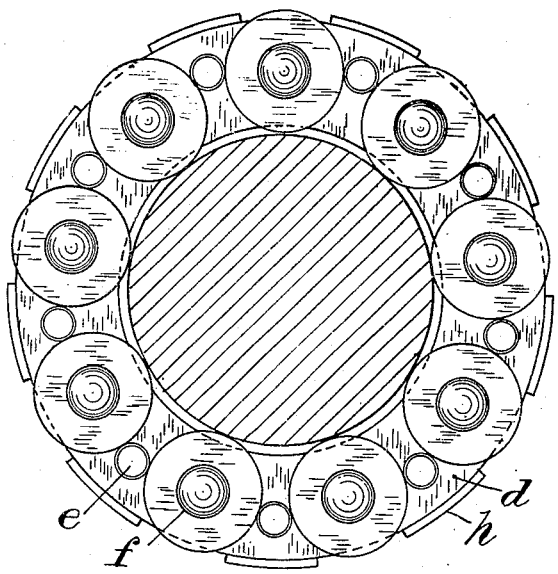
Figures 3, 4:
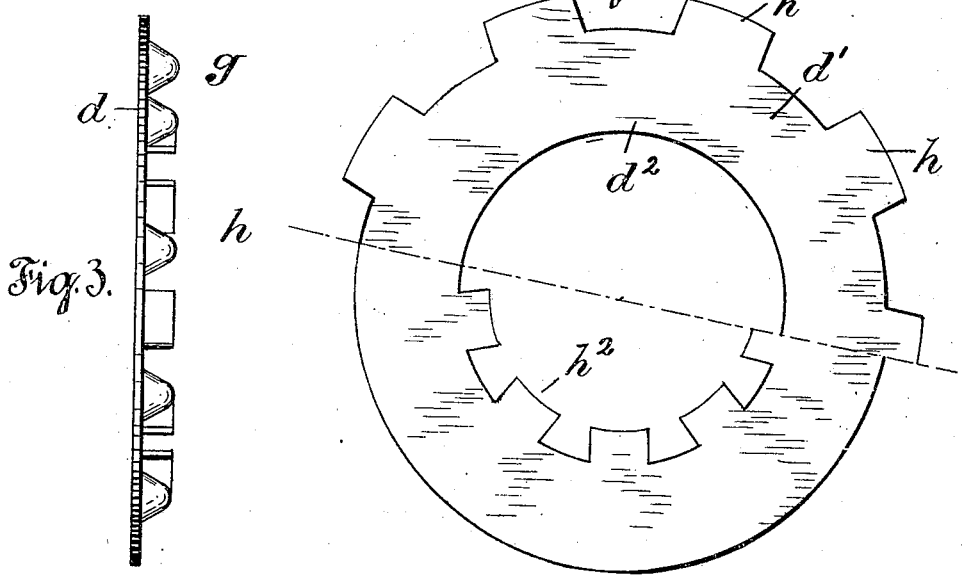

Figure 1 is an end view of a cage and its rolls with the nearer head removed; Fig. 2 is a longitudinal section of the cage and a casing embracing the rolls; Fig. 3 is an edge view of one of the heads with the lugs upon its inner portion to move upon the shaft; and Fig. 4 is a representation, in its upper half, of a blank to form the head with lugs upon its outer periphery, and in its lower half, of a head to form lugs upon the inner periphery.

*a* designates the shell of the casing with flanges *b* at the ends between which the cage and rolls revolve around the shaft *c*.

The cage-heads *d* are shown stamped of sheet-metal connected by tie-bars *e* between the rolls *f*, which are shown hollow, formed each of a spirally wound strand. The heads are shown with studs *g* pressed therefrom to enter the ends of the rolls to hold them in the cage when removed from the bearing. The studs do not contact with the rolls when in motion, but the rolls are guided by the tie-bars *e*.

In Figs. 1 and 2, the outer periphery of each head is formed with integral lugs *h* which are first formed as lugs *h'* upon a flat blank *d'* as shown in the upper part of Fig. 4 and then bent inwardly, by stamping in suitable dies, at right angles to the plane of the blank, and at the same time curved as shown in Fig. 1, to form collectively a sectional cylindrical bearing to rest upon the bore of the casing. With such construction, the bore or inner periphery $d^2$ of the blank *d'* is made a little larger than the shaft to clear the same as shown in Figs. 1 and 2.

In the lower part of Fig. 4, lugs $h^2$ are shown projected from the inner periphery of the blank, and an edge view of a head having such lugs adapted to bear movably upon the shaft, is shown in Fig. 3. With this construction, the outer periphery of the head is made a little smaller than the bore of the casing so as to clear the same, so that the cage-heads are guided solely by the bearing of the lugs upon the shaft.

Cages having a large bearing upon the cylindrical surface within the casing have often been made of cast metal milled and turned to the required form, but the present invention furnishes a cheap construction by which the cage-heads are stamped from sheet-metal and may be furnished with any desired bearing upon the cylindrical surfaces within the casing. The invention also has the advantage of being applicable to roller-bearings already constructed with thin cage-heads, which are deficient in their bearing and tend constantly to cut into the shaft or casing with which they move in contact. Such cage-heads can be removed from the cage and the cage-heads described herein substituted therefor, without requiring any alteration whatever in the casing.

I am aware that roll-separators have been used which rest movably upon the interior of the casing; but the parts of my cage which furnish the increased bearing-surface do not contact with the rolls or serve in any way to separate or guide them, but the cage requires other means of guiding the rolls, which are shown in the bars $e$ in Figs. 1 and 2. Fig. 1 clearly shows that the inwardly turned lugs which afford the increased bearing-surface for my cage-heads do not contact with the rolls, but lie between the curved surfaces of the rolls so as to clear the same; and my invention includes this particular disposition of the bent lugs upon the heads.

Having thus set forth the nature of the invention what is claimed herein is:

In a roller bearing, the combination, with a casing and rolls therein, of a roll-cage having sheet-metal heads with tie-bars connecting the same between the rolls to guide the rolls, and a series of bearing-lugs projected from the peripheries of the heads toward one another between the rolls and curved to fit movably in contact with the cylindrical surface of the bearing, and studs upon the heads to hold the rolls in the cage when removed from the casing.

In testimony whereof I have hereunto set my hand in the presence of two subscribing witnesses.

CHARLES S. LOCKWOOD.

Witnesses:
G. C. STULTS,
E. I. WILLIAMS.